United States Patent [19]

Müller et al.

[11] Patent Number: 4,604,665
[45] Date of Patent: Aug. 5, 1986

[54] DRIVING MECHANISM FOR MAGNETIC HARD DISC

[75] Inventors: Rolf Müller; Dieter Elsässer, both of St. Georgen; Johann von der Heide, Mönchweiler; Georg Papst, St. Georgen, all of Fed. Rep. of Germany

[73] Assignee: Papst-Motoren GmbH & Co. KG, Black Forest, Fed. Rep. of Germany

[21] Appl. No.: 440,537

[22] Filed: Nov. 10, 1982

Related U.S. Application Data

[63] Continuation-in-part of Ser. No. 326,559, Dec. 2, 1981, Pat. No. 4,519,010.

[30] Foreign Application Priority Data

Dec. 5, 1980 [DE] Fed. Rep. of Germany ....... 3045972
Nov. 10, 1981 [DE] Fed. Rep. of Germany ....... 3144629
Dec. 3, 1981 [GB] United Kingdom ................. 8136443

[51] Int. Cl.$^4$ ...................... G11B 17/00; G11B 25/04
[52] U.S. Cl. ..................................... 360/97; 310/67 R
[58] Field of Search ..................................... 360/97–99, 360/106–107, 133; 310/268, 67 R, 68 R

[56] References Cited

U.S. PATENT DOCUMENTS

| 3,329,845 | 7/1967 | Lear | 310/67 R |
| 3,527,969 | 9/1970 | Papst | 310/51 |
| 4,034,411 | 7/1977 | Kraemer et al. | 360/98 |
| 4,216,512 | 8/1980 | Vidwans | 360/133 |
| 4,307,425 | 12/1981 | Kaneko et al. | 360/98 |
| 4,337,491 | 6/1982 | Hasler et al. | 360/97 |
| 4,363,046 | 12/1982 | Saito | 360/107 X |

FOREIGN PATENT DOCUMENTS

1596767 8/1981 United Kingdom .

Primary Examiner—John H. Wolf
Attorney, Agent, or Firm—Fitch, Even, Tabin & Flannery

[57] ABSTRACT

A driving mechanism for magnetic hard disc memories includes an isolated space for maximum cleanness from the remainder of the apparatus, a driving motor mounted within the apparatus and having a stator and a rotor, the motor when energized having parts producing magnetic flux, a hub extending into the space of maximum cleanness for receiving therein at least one magnetic hard memory disc, a connection between the motor and the hub for driving the hub, and a magnetic flux shield located between the parts producing the magnetic flux and the space of maximum cleanness.

14 Claims, 11 Drawing Figures

DRIVING MECHANISM FOR MAGNETIC HARD DISC

This application is a continuation-in-part of U.S. Ser. No. 326,559, filed Dec. 2, 1981, now U.S. Pat. No. 4,519,010.

The invention relates to a driving mechanism for magnetic rigid or hard disc memories with a driving motor having a stator and a rotor for driving a hub for receiving at least one hard memory or storage disc and located within a first space of the device.

Hard memory discs are suitable for storing large quantities of data, which can be written or read out with the aid of a magnetic head arrangement if the disc is rotated with respect to the magnetic head arrangement.

In practice, it has been found that occasionally data stored on the hard memory disc are lost and/or problems occur when writing in or reading out the data.

The problem of the invention is to provide a driving mechanism for hard disc memories preventing data losses and avoiding problems during data input and output.

The invention is based on the finding that the cause of the aforementioned deficiencies can be magnetic fields emanating from the driving arrangements. These problems may be caused not only by high frequency fields, but also by low frequency fields. There can in particular be a demagnetization of the magnetic coating of the disc. As has been shown, the magnetic coating can be damaged even with fields above approximately 3 to 5 gauss.

According to the invention, the problem is solved in that a magnetic shield is arranged between the driving parts producing the magnetic fields and the portion of the first space intended for housing the hard memory disc. Such a shield makes it possible to prevent or at least considerably reduce leakages of the magnetically active motor part in the vicinity of the disc, so that also the static or low frequency magnetic field is reduced to harmless values in the vicinity of the discs.

Preferably, in the vicinity of the axial end of the magnetically active motor part there is a magnetic shielding zone and adjacent the other axial end of the motor is a ventilation zone which is sealed relative to the first area. Thus, on one side of the driving motor an area which is substantially free from magnetic interference fields is produced, while on the other side of the motor a zone is obtained which in the assembled condition is separated from the first area and between which there is a forced turbulence of the ambient air, desired for cooling purposes.

The driving motor is preferably designed as a brushless direct current external or outer rotor-type motor with a permanent magnetic rotor. In a circular rotor casing there is advantageously a one-part permanent magnetic ring or a permanent magnetic band with an approximately trapezoidal radial magnetization over the pole pitch which is bent in annular manner. The permanent magnets can be in particular plastic-bound magnets or so-called rubber magnets. Such magnets are made from mixtures of hard ferrites and elastic material, particularly barium ferrite combined with elastomer.

The hub can form part of the circular rotor casing. In such a way, the magnetic shield is appropriately located within the rotor casing, so that the permanent magnet of the outer rotor is preferably surrounded in bell-like manner by the magnetic shield and so that no magnetic stray fields can propagate in the direction of the hub and the hard memory discs located on the hub. To obtain a magnetic shield which on the one hand requires relatively little shielding material and on the other ensures a particularly effective suppression of the stray fields, the magnetic shield is appropriately partly formed by at least one shielding member rotating with the rotor and partly by at least one fixed shielding member.

The rotor casing can substantially be in the form of a bell, which is open on the face remote from the hub. If in such a case the rotor casing is made from magnetically non-conducting or poorly conducting material, the rotor bell is preferably at least partly lined with magnetic shielding material.

A driving mechanism of the aforementioned type generally comprises a speed control circuit and/or driving electronics, which in the case of a brushless direct current motor, particularly ensures the necessary commutation. If the magnetic shield also comprises a shielding ring connected to the motor stator, this ring can additionally be used for cooling the speed control circuit and/or driving electronics, particularly if semiconductor components are held in the thermally conductive contact with the shielding ring.

Instead of constructing the hub as part of the rotor casing, according to a modified embodiment of the invention the rotor casing can be shaped like a bell open towards the hub, a rotor which is concentric to the rotor casing being connected thereto on whose end remote from said casing is mounted the hub. The open rotor casing end is covered by means of a shielding plate.

On the face remote from the hub, the rotor preferably carries a fan for forming the ventilation zone. Such a construction is not only particularly simple, but also leaves the circumferential face of the rotor free as a braking surface for a brake which is frequently provided with such driving mechanisms.

The magnetic tracks of hard memory discs are extremely close to one another. Furthermore, despite the high precision, certain tolerances and eccentricities of the hard memory discs, the hub and/or the bearing system for the rotor shaft are unavoidable. As a result, on disassembling the rotor shaft, for example to service the motor, the alignment between the magnetic head arrangement and the magnetic tracks of the hard memory disc may be lost. A resulting misalignment leads to a loss of the data stored on the disc, so that the disc must be rewritten. In order to avoid such a data loss when parts of the drive, particularly components of the driving electronics or the speed control circuit or the stator winding fail, according to the invention at least certain parts of the stator and/or rotor are detachably connected to the rotor shaft, independently of the connection between the shaft and the hub. This makes it possible to replace defective drive parts without losing the reciprocal alignment between the magnetic head arrangement and the magnetic tracks on the hard memory disc. To make it unnecessary to obviate the need for entering the highly clean space or chamber containing the memory disc during such a replacement, the detachable parts of the stator and/or rotor are preferably accessible from the side of the driving mechanism remote from the hub.

In conformity with a further development of the invention a rotor shaft which is connected to the rotor casing, is mounted in a mounting tube which mounting tube is sealed against the space for housing the hard memory disc, in order to prevent the transfer of contaminant particles, e.g. oil or grease particles, from the bearing system into the clean space or chamber for receiving the hard memory disc or discs. In this respect magnetic fluid seals inserted into the mounting tube proved to be particularly effective; such magnetic fluid seals per se are known for example, under the trademarks Ferrofluidic seal (manufactured by the Ferrofluidics Corporation, Nashua, N.H. , U.S.A.) and Magring seal (manufactured by the Servoflo Corporation, Lexington, Mass., U.S.A.). As to further particulars reference is made to the leaflet "Ferrofluidic Sealing Capabilities" by Ferrofluidic Corporation, 1979, and the following articles: Persson, N.C., "Tonic Prevents Computer Amnesia", *Design News,* Apr. 18, 1977; Bak, David J., "Magnetic Shaft Seal Protects Optical Encoder", *Design News,* Jan. 19, 1981; and Rosensweig, R. E., Miskolczy, G., and Ezekiel, F. D., "Magnetic-Fluid Seals", *Machine Design,* Mar. 28, 1968.

Functional members and/or mounting members, e.g. a magnetic flux conducting ring of a fluidic seal, preferably may be integrated into the mounting tube, e.g. integrally casted together with this tube.

When the rotor is designed as a permanent magnetic external rotor, the rotor casing advantageously may be detachably connected to the rotor shaft which is mounted in a mounting tube, and the stator lamination may be detachably mounted on the mounting tube. This permits replacement, if required, not only the rotor casing together with the permanent magnet or magnets, but also the stator lamination which carries the stator winding, without affecting the relative alignment between the magnetic head arrangement and the magnetic tracks of the hard memory disc. When the driving electronic unit and/or a speed control circuit is housed within the motor on a printed circuit board, this circuit board preferably is connected to the stator lamination so that the circuit board may be detached from the ring bearing together with the stator lamination.

The invention is described in greater detail hereinafter relative to preferred embodiments and the drawings, wherein.

Figure 1:
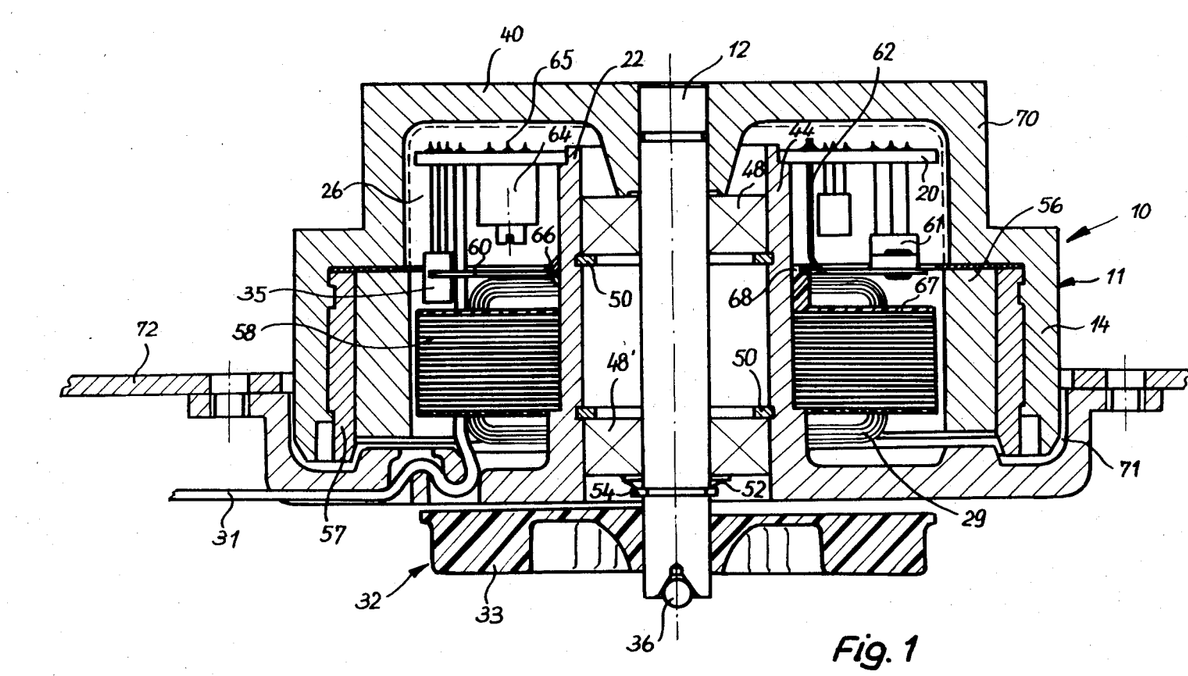
FIG. 1 is a section through an embodiment of the driving mechanism according to the invention.

The driving mechanism 10 illustrated in FIG. 1 has a brushless direct current motor 11 with a rotor casing 14 fixed to a rotor shaft 12 and concentric to the latter. A stator lamination 58 carrying a stator winding 29 forms part of the stator of motor 11. The stator lamination 58 surrounds a bearing tube 44 forming part of a central support 22. Rotor shaft 12 is mounted in bearing tube 44 with the aid of two bearings 48, 48', which are held in place by spaced retaining rings 50. A cup spring 52 bears on the bottom of bearing 48' and a retaining ring 54 located on rotor shaft 12, so that bearings 48, 48' are axially braced relative to one another. Together with an assembly flange 30, bearing tube 44 forms a one-piece die casting. As an alternative, the bearing tube 44 can be force-fitted into a hub joined to flange 30.

Rotor casing 14 not only surrounds the stator lamination 58, while forming a cylindrical air gap 15, but on the side remote from assembly flange 30 is axially extended so that hub 70 is obtained. Hub 70 is used for supporting and driving one or more hard storage discs (not shown), each having a central bore whose diameter corresponds to the external diameter of hub 70. The discs can be commercial 5¼" or 8" discs. The illustrated construction makes it possible to adapt the diameter of driving hub 70 to the central bore of the discs without taking account of the necessary drive power of motor 11 and the resulting most favorable diameter of air gap 15. A printed circuit board 20 is housed in the free space 26 within hub 70. The printed circuit board 20 is constructed in annular manner and is connected to the central support 22. The circuit board 20 carries the drive electronics and a speed control circuit, which includes, inter alia, a Hall IC 35 serving as a rotation position detector, output stage transistor 61 and a potentiometer 64. The soldered joints of the circuit components of the drive electronics and the speed control circuit, which are preferably produced in one operation, e.g. in a dip soldering process, are indicated at 65. Potentiometer 64 can be used, inter alia, for setting different operating points or for compensating component tolerances. It can be adjusted by means of a screwdriver via a bore (not shown) in flange 30 and one of the slots in stator plates 58. A line 31 leading to the printed circuit board 20 is connected to a d.c. voltage source. The side of circuit board 20 carrying the soldered joints 64 faces the base 40 of rotor casing 14.

In this embodiment, rotor casing 14 is made from a magnetically non-conducting or poorly conducting material, e.g. an aluminum alloy die casting. A plurality of continuous segments or a one-part permanent magnet 56 is fixed to the inner surface of rotor casing 14 facing stator plate 58. The permanent magnet is preferably made from a mixture of hard ferrite, e.g. barium ferrite and an elastic material, and thus forms a so-called rubber magnet. It is trapezoidally or approximately trapezoidally radially magnetized via the pole pitch with a relatively small pole clearance. A magnetic flux return ring 57 is located between the rotor casing 14 and the permanent magnet 56. It is fundamentally also possible to make the rotor casing 14 from magnetically conductive material, particularly soft iron, e.g. in the form of a deep drawn part. In such a case, there is no need for the soft iron flux return ring 57.

The magnetic flux return ring 57 is part of a magnetic shield, which also includes a shielding ring 16 and a further shielding ring 60. Shielding ring 16 is inserted between the face of permanent magnet 56 facing hub 70 and a shoulder 17 of rotor casing 14 and rotates together with the latter. However, shielding ring 60 is fixed. It is connected by means of brackets 62 to the circuit board 20 and is appropriately additionally fixed by means of fastenings or glued joints 66 to the ring bearing 44 in the vicinity of a collar 68 of the stator or via pins (not shown) to an end plate 67 of the stator. This prevents oscillating movements of the shielding ring 60.

Flux return ring 57 and the two shielding rings 16, 60 surround in bell-like manner the magnetically active part of driving mechanism 10. This effectively prevents the propagation of stray magnetic fields in the vicinity of the hard memory discs located on hub 70. It is not possible for there to be any significant penetration of the stray field through the annular clearance between shielding ring 16, 60 and the recesses of the shielding ring 60 for the passage of the Hall IC 35 or a plurality of such Hall IC's, because the soft magnetic shielding rings attract this field to them. In the represented embodiment, the fixed shielding ring 60 is simultaneously used as a heat sink for the output stage transistors 61 which are connected in thermally conductive manner to the shielding ring 60 by a full surface engagement. The cooling members of the output stage transistors 61 can, if necessary, be electrically insulated from shielding ring 60, e.g. by means of a mica disc or the like. It is also possible to subdivide the shielding ring 60 as a function of the number of output stage transistors 61 in order to obviate such an electrical insulation.

Assembly flange 30 makes it possible to mount driving mechanism 10 in the manner shown in FIG. 1 on a partition 72 of the otherwise not shown hard disc. Partition 72 separates the area of maximum cleanness for receiving the hard memory disc from the remainder of the interior of the apparatus. Dirt particles, grease vapors or the like which may emanate from bearing 48 consequently also have no detrimental action. The connection to the interior of the motor is provided only by a gap 71 between rotor casing 14 and assembly flange 30. This gap 71 is relatively long. In addition, one or more seals may optionally be provided in the vicinity of gap 71.

A fan 32 with fan blades 33 is fixed to the free end of rotor shaft 12 remote from hub 70. Fan 32 brings about an intense movement of the air in the vicinity of assembly flange 30, so that the latter is cooled. By means of bearing tube 44 and flange 30, heat due to energy losses from motor 11 is effectively conducted to the outside.

To prevent electric static charging of the rotor bell, which is detrimental to the operational reliability of the disc memory, rotor shaft 12 is electrically conductively connected to the apparatus shaft by means of a bearing ball 36 and a spring contact (not shown).

Figure 2:
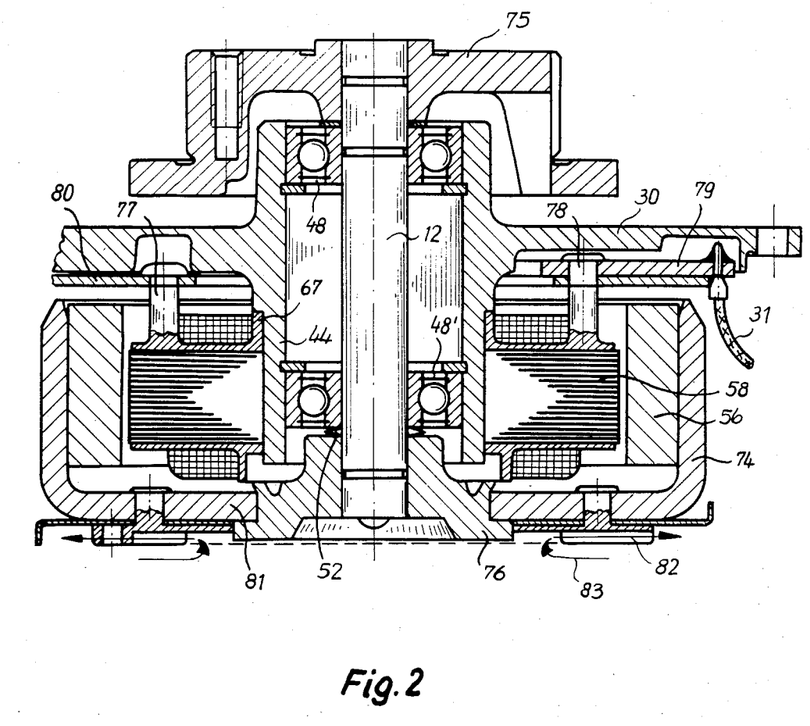
FIG. 2 is a section through a modified embodiment.

The embodiment of FIG. 2 functionally substantially corresponds to that of FIG. 1. A rotor casing 74 is shaped like a bell and opens out towards assembly flange 30. A hub 75, however, differing from the hub in the embodiment of FIG. 1, is separate from the rotor casing 74 and is fixed to the free end of the rotor shaft 12. In this embodiment, the rotor casing 74 is made from magnetically conductive material and is preferably deep-drawn. It is connected to the rotor shaft 12 by a hub body 76, which is pressed into the central opening of the rotor bell. The permanent magnet 56 directly engages the inner wall of the rotor casing 74. A printed circuit board 79 and a substantially flat shielding plate 80 are connected to the end plate 67 of the stator by means of brackets 77, 78. In conjunction with rotor casing 74, a shielding plate 80 prevents the escape of magnetic flux into the space taken up by the hard memory discs. In the same way as in the embodiment of FIG. 1, the steel ball bearing 48 offers a certain shielding action. Semiconductor components of the driving electronics and/or the speed control circuit which are not shown in FIG. 2 can be held in thermally conductive contact with the assembly flange and/or the shielding plate 80 for cooling purposes.

An axially flat radial impeller constructed as an injection molded part is fixed to the outside of base 81 of rotor bell 74 and in the manner indicated by arrows 83 draws air into the central area and discharges it radially outwards.

Figure 3:
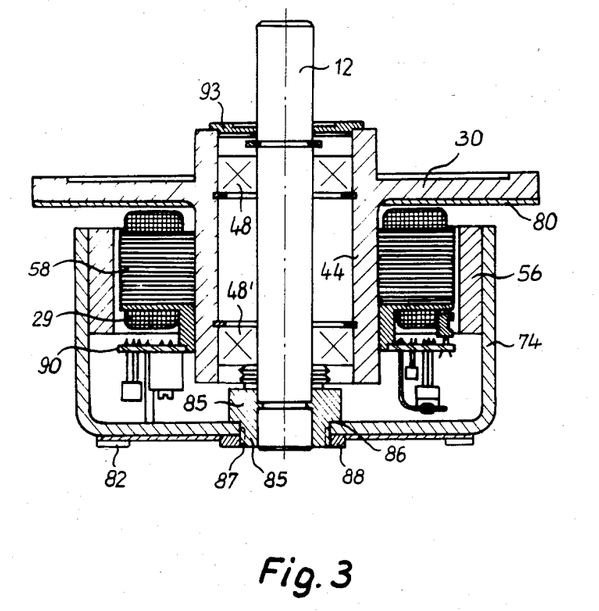
FIG. 3 is a section through a third embodiment similar to that of FIG. 2.

In the embodiment of FIG. 3, the bell-shaped rotor casing 74 is detachably connected to rotor shaft 12. For this purpose, a hub body 85, fixed to rotor shaft 12, has a seat 86 for the rotor bell and an external thread 87. A screw ring 88 can be screwed into the external thread 87 and, when so screwed, pressed in a detachable manner the rotor casing 74 against seat 86 of hub body 85. In a manner not shown, seat 86 can be a conical seat.

After detaching screw ring 88, for example, to work on the motor, the rotor casing 74 can be drawn off without there being any modification to the reciprocal alignment between the rotor shaft 12 or a hub corresponding to hub 75 according to FIG. 2 attached on the free end of the shaft and the magnetic head arrangement of the hard memory disc. After removing the rotor casing 74, access can be obtained to driving electronics and a speed control circuit located on a printed circuit board 90. If necessary, the printed circuit board 90 can be removed from the stator and replaced. If desired, the arrangement can also be such that stator lamination 58 can be removed from the bearing tube 44 together with the stator winding 29.

Of course, the above-described embodiments can, if necessary, be modified. For example, it is possible to provide the hub 70 of the arrangement of FIG. 1 with a magnetically shielding lining in the manner indicated by dotted lines at 91. FIG. 3 shows a seal 93 above bearing 48 and its function is to prevent any grease vapors or the like from bearing 48 from passing into the space receiving the hard memory discs. A corresponding seal 93 is preferably also provided with the embodiment of FIG. 2. Seal 98 can appropriately be so constructed as a low friction lip seal. In place of this or in addition thereto, bearings 48, 48' can be constructed as sealed precision bearings.

In the case of a brushless direct current motor 11, it can advantageously be a single-phase direct current motor with an auxiliary reluctance torque (one or two-pulse) as disclosed in U.S. Pat. No. 3,873,897 or a three-phase direct current motor of the type described in the earlier dated West German application No. P 30 21 328.6. The idling speed of motor 11 can be 5,800 r.p.m. and the nominal speed, e.g., 3,600 r.p.m. Advantageously, the stator has four marked, wound poles, whose pole tips are deformed in such a way that in the vicinity thereof the width of the air gap 15 is modified and consequently the auxiliary reluctance torque is produced.

Figure 4:
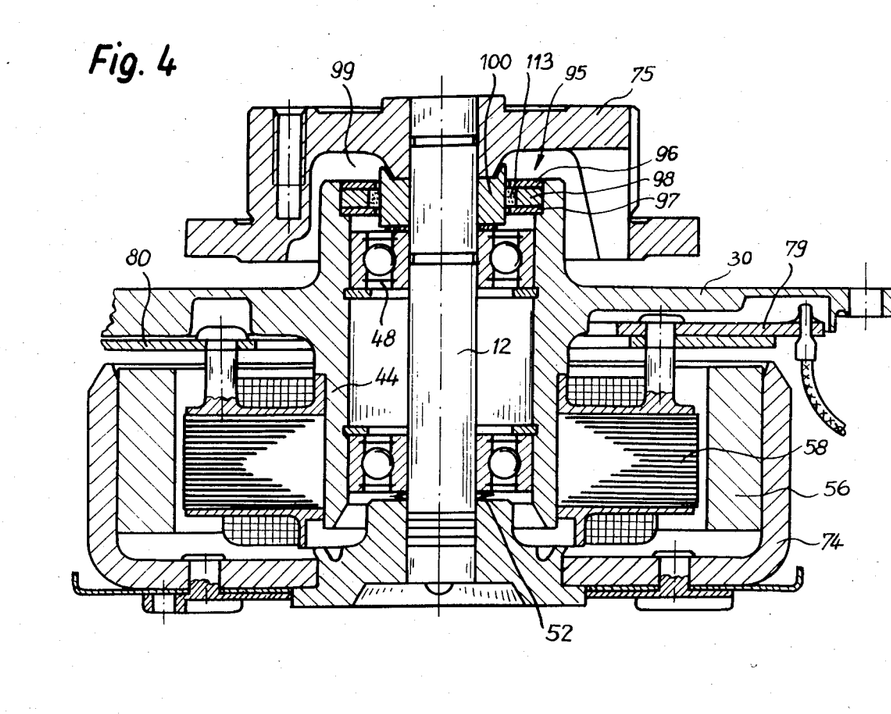
FIG. 4 is a section through an embodiment which is identical to the embodiment of FIG. 2 with the exception of sealing means being provided in the mounting tube.

The embodiment of FIG. 4 substantially is identical to that of FIG. 2. However, in order to seal the bearing system of rotor shaft 12 relative to the space receiving the hard memory disc or discs, a magnetic fluid seal 95 is inserted into the bearing tube 44 in the region between the hub 75 and the bearing 48. The magnetic fluid seal 95 consists of a pair of pole pieces 96, 97, a permanent magnet ring 98 positioned between the two pole pieces, and a magnetic liquid 113 which is introduced into an annular gap 99 between the magnet ring 98 and a sleeve 100 fixed to the rotor shaft 12. Such a seal is known under the trademark Ferrofluidic mentioned earlier. The seal 95 prevents contaminant particles moving from the bearing system into the chamber receiving the hard memory discs.

Figure 5:
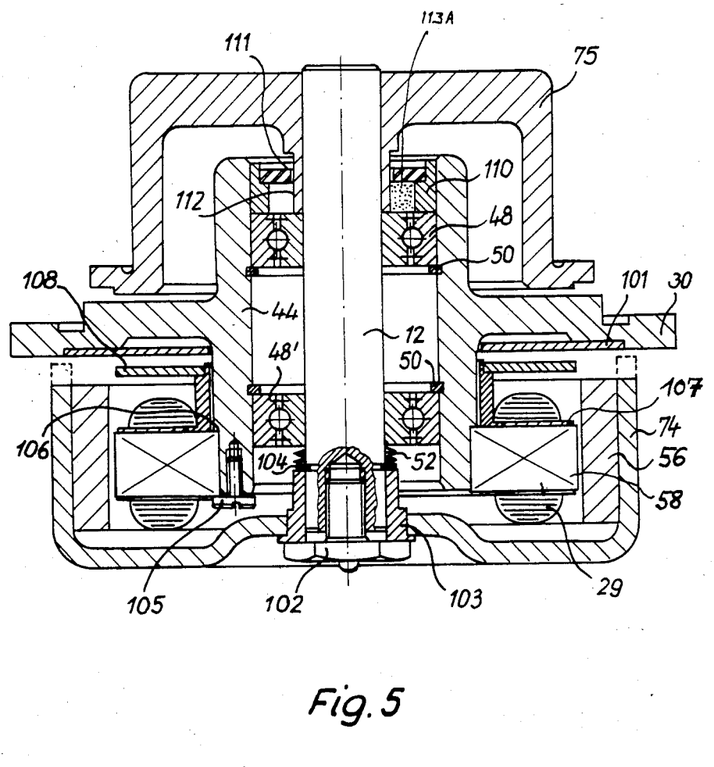
FIG. 5 is a section through a further modified embodiment of the invention comprising detachable rotor and stator members.

The embodiment of FIG. 5, in a manner similar to the embodiment of FIG. 2, comprises the rotor shaft 12 which carries the hub 75 at one of its ends, the rotor shaft being rotatably mounted by bearings 48, 48' in the bearing tube 44 which merges into the mounting flange 30. A shielding ring 101 is fixed to the lower surface of mounting flange 30 in concentric relationship relative to bearing tube 44. The rotor casing 74 and the permanent magnet 56 are detachably fixed to rotor shaft 12. For this purpose a screw 102 engages a central threaded bore at the lower end of the rotor shaft 12 (FIG. 5). The head of screw 102 engages a hub body 103 of the rotor casing 74 and urges the hub body against a securing ring 104. The latter is inserted into a circumferential groove of the rotor shaft 12. Cup springs 52 abut the opposite side of ring 104. The stator lamination 58 is detachably mounted on one end (in FIG. 5, the lower end) of mounting tube 44. The stator lamination 58 is urged against a shoulder 106 of the mounting tube 44 by screws 105 which are screwed into the lower end of the mounting tube 44. Only one of screws 105 is illustrated in FIG. 5. A body 107 which is connected to the stator lamination 58 carries at its free end (the upper end in FIG. 5) a printed circuit board 108 for the driving electronic unit and/or a speed control circuit.

By loosening the screw 102 the first rotor casing 74 together with the permanent magnet 56 may be removed from rotor shaft 12. Then, upon loosening of screws 105, the stator lamination 58 carrying stator winding 29, and the printed circuit board 108 likewise may be detached from bearing tube 44. The relative alignment between the magnetic head arrangement of the disc memory and the magnetic tracks of the hard memory discs mounted on the hub 75 is not affected thereby.

A sleeve 110 is pressed into the upper end of mounting tube 44 in the region between the upper bearing 48 and the hub 75. The sleeve 110 carries a permanent magnet ring 111. A magnetic liquid 113A is introduced into the gap between the permanent magnet ring 111 and an extension 112 of hub 75. This magnetic liquid together with magnet ring 111 defines a Magring seal (of Servoflo Corporation). This seal, in the same manner as seal 95 of the embodiment of FIG. 4, prevents the movement of grease or oil particles from the bearing system into the chamber receiving the hard memory discs.

The sleeve 110 need not be a separate member. Rather, it may be integrated into the bearing tube 44. In the embodiment of FIG. 4, at least the pole piece 97 may be integrally molded (casted) into the bearing tube 44.

As follows from FIG. 5, the rotor casing 74 in this embodiment does not carry blower blades or the like. In view of the high speed of rotation of the rotor casing 74 used in the case of a hard disc memory, a considerable ventilation effect is obtained by the rotation of this casing.

In order to further improve the magnetic shielding effect, the rotor casing 74, as indicated in FIG. 5 by dashed lines, may protrude beyond the permanent magnet 56 and extend closely up to the magnetic shielding ring 101.

The invention is applicable with advantage at motors for machines with removable disks, so-called cartridges, also. There is still, also a need for a non-removable motor shaft, all the more as in some cases in one machine might be used a fixed disk and one (or more) removable disk(s) together. It might be advantageous also with respect to floppy disk systems.

In much the same way as in the embodiments of FIGS. 2 to 5, the embodiment according to FIGS. 6 to 9 has a rotor casing 14 made from a good magnetically conducting material and in particular mild steel. Hub 75 is not shown. Slotted supports 114 are shaped onto the upper stator end plate 65 in FIG. 6 and in the case of this embodiment, said supports carry three shielding and cooling plates 60 which are electrically separate.

Figure 6:
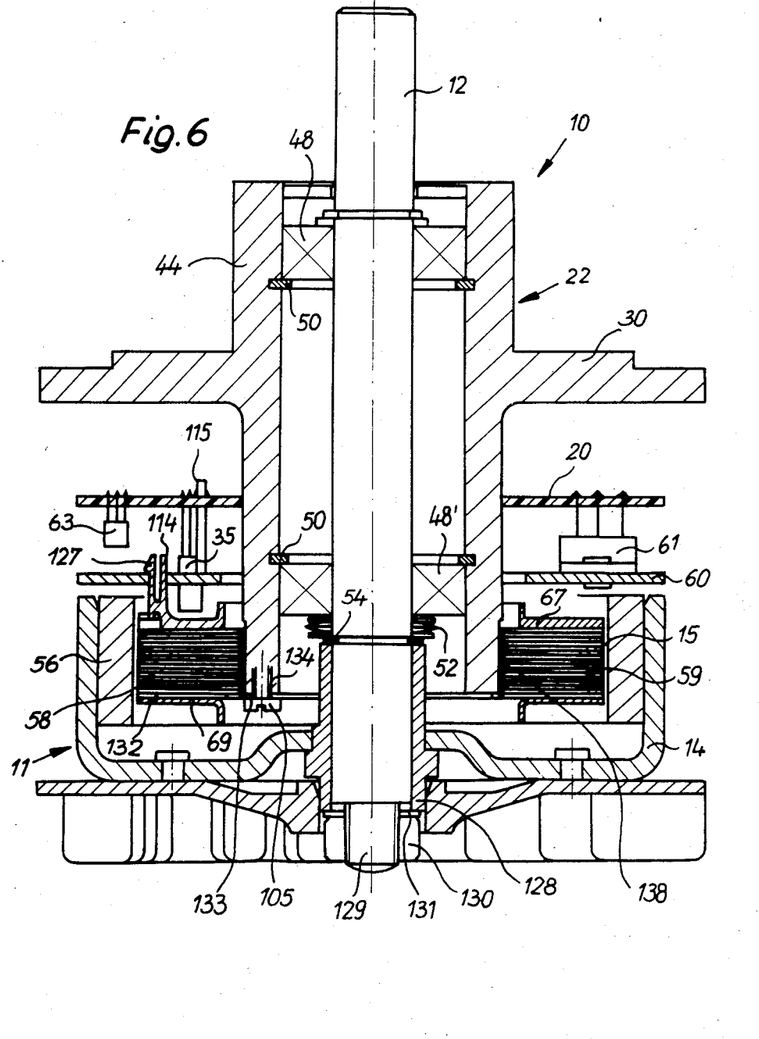
FIG. 6 is a section through another modified embodiment of the invention comprising detachable rotor and stator members.

In turn, the shielding and cooling plates 60 are provided with legs 115 for holding circuit carrier 20 constructed in the form of a printed circuit board, with rotation position detectors 35, output stage transistors 61 and further circuitry components, whereof one is indicated at 63. Core 58 carrying the stator winding, circuit carrier 20 and the shielding and cooling plate 60 in this way form a pre-assembled unit, which can be connected to the remaining motor assemblies as an entirety and which permits a precise reciprocal angular alignment of the stator pole clearances and the rotation position detectors 35.

Figure 7:
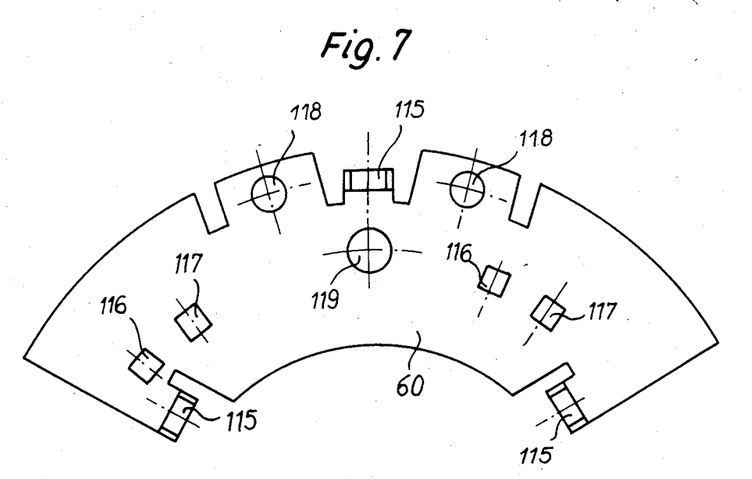
FIG. 7 is a large scale plan view of one of the cooling plates of the arrangement of the device shown in FIG. 6.
Figure 8:
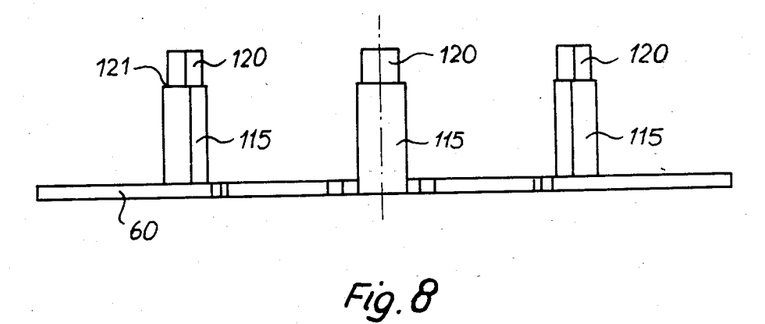
FIG. 8 is a side view of the cooling plate of FIG. 7.
Figure 9:
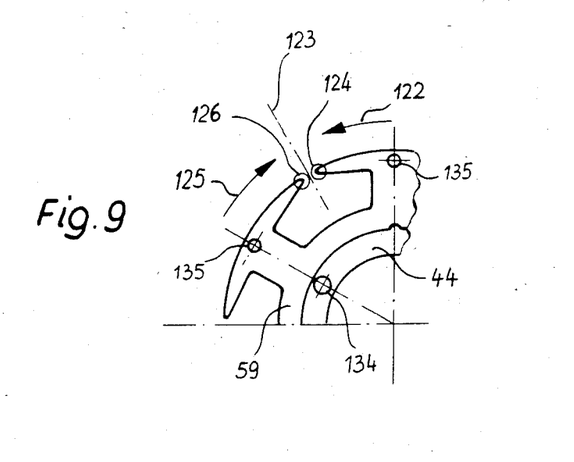
FIG. 9 is a partial plan view of the stator winding core with a diagrammatically indicated rotation position detector in the position for rotation to the right or left.

As can be gathered in detail from FIGS. 7 and 8, each of the shielding and cooling plates 60 has two groups of rectangular recesses 116, 117. Each of the plates 60 is held by two supports engaged either in recesses 116 or recesses 117 as a function of the motor rotation direction. Each of the plates 60 is in good thermally conducting connection with in each case one of the output stage transistors 61 of circuit carrier 20. Openings 118 are provided in the shielding and cooling plates 60 for fixing the output stage transistors 61. Plates 60 also contain a guidance opening 119, through which is passed one of the rotation position detectors 35, preferably Hall IC's soldered to circuit carrier 20. Rotation position detector 35 is stuck in guidance opening 119 in order to ensure a particularly stable seat. Each of the plates 60 is provided with a group of three legs 115 stamped from the sheet metal material forming the shielding and cooling plate and are bent upwards at right angles with respect to the plane of the plate. Attachments 120 of legs 115 are inserted through corresponding recesses in circuit carrier 20 and are soldered to the latter. These attachments 120 form shoulders on which rest the circuit carrier 20. Here again, the soldering of attachments 120 appropriately takes place in one operation, e.g. by dip soldering, with the production of the soldered joints between circuit carrier 20 and the circuitry components of the driving electronic and control circuit.

It has proved advantageous in practice to displace the rotation position detector or detectors 35 by a certain lead angle, i.e. by a certain amount counter to the rotation direction with reference to the stator pole clearances in the centre of the stator slot. As a result, the commutating signal is necessarily advanced compared with the induced voltage and consequently the commutated current rise delayed by the winding inductance is compensated. For example, for a rotor rotation direction 122 (FIG. 9) with reference to the slot center 123 the rotation position detector 35 should have the position indicated at 124. However, in the case of an opposite rotor rotation direction 125 a corresponding advance is sought by displacing rotation position detector 35 in the opposite direction to point 126 with reference to slot center 123. This differing alignment of the rotation position detectors with respect to the stator pole clearances as a function of the desired rotation direction is brought about here in a very simple way in that the slotted supports 114 provided with detents 127 can alternatively be engaged in recesses 116 or recesses 117, which for example have a reciprocal angular distance of 12°. Together with recesses 116 or 117, slotted supports 114 form snap connections. If necessary, they can be detached by compressing the legs of the slotted supports until the detents can pass through recesses 116 or 117.

In the embodiment of FIG. 6, for the reasons indicated thereinbefore, rotor casing 14 and winding core 58 are constructed so as to be detachable together with circuit carrier 20. To this end, a hub 128 is connected to rotor casing 14, e.g. by caulking or wedging and is placed on the lower end of rotor shaft 12 in FIG. 6. This end of rotor shaft 12 passes into a reduced diameter external thread portion 129. A standard nut, e.g. a hexagonal nut 130 is screwed onto the threaded portion 129 and by means of washer 131 presses the hub against the retaining ring 54. The end face of threaded portion 129 is rounded and, in conjunction with a not illustrated contact, can be used for eliminating electrostatic charges from shaft 12.

For the detachable fixing of winding core 58 the bottom stator lamination of the e.g. riveted bundle of laminations 59 is formed by a lamination 132 with an internal diameter which is the same or smaller than the internal diameter of mounting tube 44. This lamination 132 engages on the lower end face of mounting tube 44 in FIG. 6. In this area, it is provided with three circumferentially distributed holes 133. Self-tapping screws 105 engaging in cored holes 134 of mounting tube 44 project through holes 133.

As a result of the cooperation of screws 105 with holes 133 of stator lamination 132, torsion between mounting tube 44 and winding core 58 is effectively prevented. After removing screws 105, winding core 58 together with the stator winding (not illustrated in FIG. 6), circuit carrier 20 and shielding and cooling plates 60 can be effortlessly removed from mounting tube 44 without a detaching device being required.

Whereas in the embodiment of FIG. 6, the connection between winding core 58 and shielding and cooling plates 60 takes place by means of the support 114 on end plate 67, it is possible for example possible for the rivets 135 (FIG. 9), which are electrically insulated from the stator laminations or which are made from insulating material and serve to hold together the bundle of stator laminations, to project over the end face of winding core 58 of FIG. 6 and then the shielding and cooling plate can be fixed to said projecting rivet ends.

A layer 138 (FIG. 6) made from a soft damping material is inserted between the bundle of stator laminations 59 and that part of the mounting tube 40 which carries the latter. This damping material prevents vibrations and noise resulting therefrom.

Figure 10:
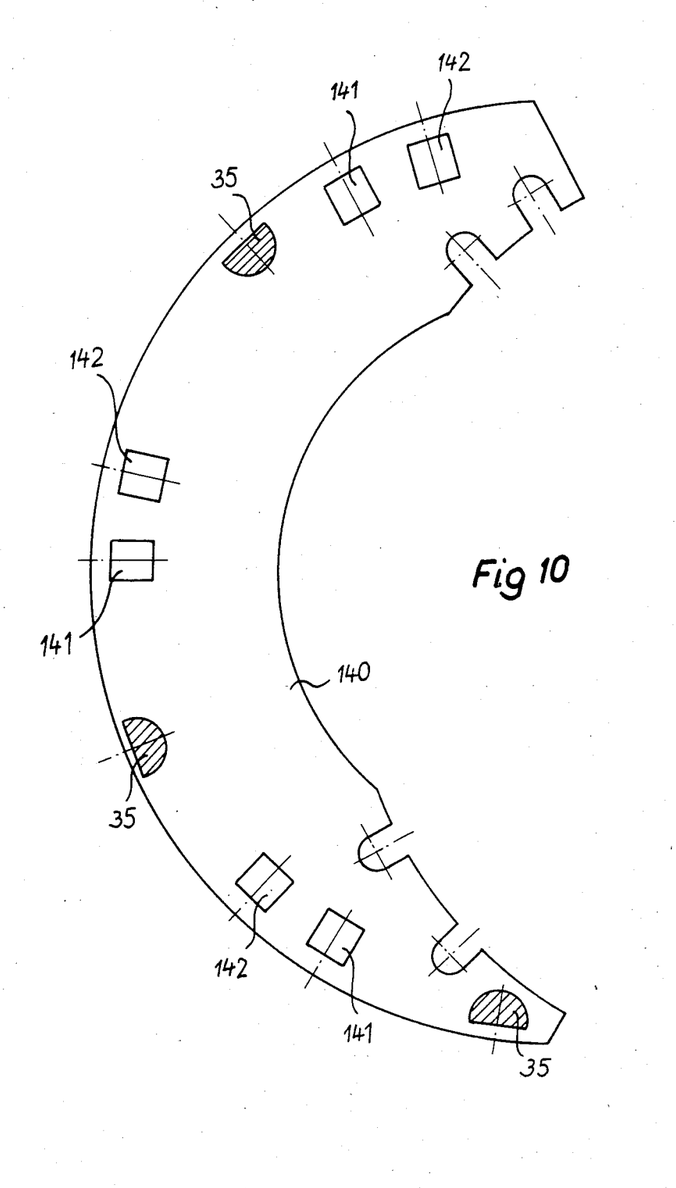
FIG. 10 is a plan view of the rotation position detector support plate.

If the drive electronics and an optionally provided control circuit are arranged separately from motor 11, in the embodiment of FIG. 6 in place of the shielding and cooling plate 60 carrying the circuit board 20 a carrier plate 140 of the type shown in FIG. 10 can be clipped to three of the slotted supports 114. Plate 140 then only carries the rotation position detectors 35 35 constituted in the present embodiment by three Hall IC's at a reciprocal angular distance of 60°. In much the same way as with shielding and cooling plate 60 carrier plate 140 is provided with three groups of rectangular recesses 141, 142, having e.g. a reciprocal angular distance of 12°. When supports 114 are engaged either in recesses 141 or in recesses 142, a desired lead angle for one or other motor rotation direction can be set for commutating purposes. In this case, magnetic shielding can, for example, be provided in that in the area between end plate 67 and the bottom of flange 30 a not shown shielding ring is provided.

Figure 11:
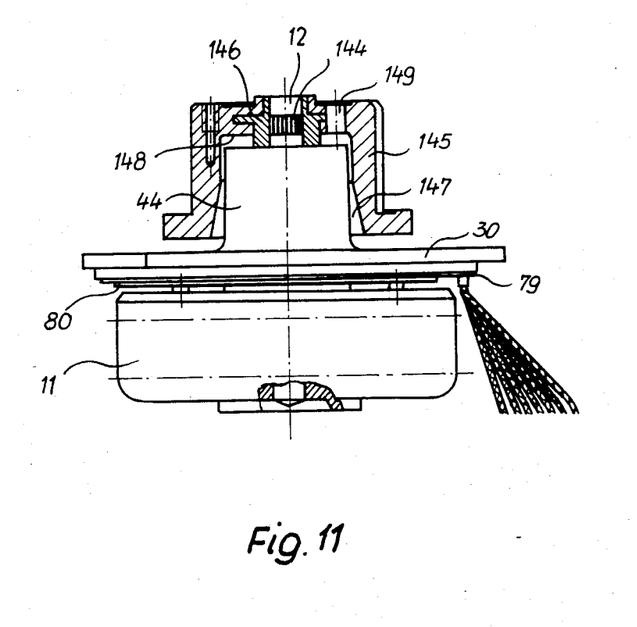
FIG. 11 is a side view of another modified embodiment of the driving mechanism.

In the embodiment of FIG. 11, a hub 145 with a cast-in bush 146 is pressed onto the upper end of rotor shaft 12, which is provided with a milled edge 144. The internal diameter of hub 145 is larger by a relatively small amount than the external diameter of mounting tube 44 and, as shown at 147, the inner area of the hub is widened conically in a downward direction. Base 148 of hub 145 is spaced from the upper end plates of mounting tube 44 and this distance is greater than the distance between the inner peripheral wall of the hub from the outer peripheral wall of the mounting tube. A plurality of bores 149, of which only one is shown in FIG. 11, extends parallel to the rotation axis through base 148 of hub 145. It has been found that this construction leads to a particularly effective formation of a desired air flow in the vicinity of the rigid memory discs located on hub 145.

Although the invention has been described in connection with a preferred embodiment and certain alternative embodiments, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A driving mechanism for magnetic hard discs, comprising:
   means in said mechanism isolating a space for maximum cleanness;
   a driving motor mounted within said apparatus and having a stator and a rotor, said motor when energized having parts producing magnetic flux;
   a rotor shaft mounting said rotor, said shaft being mounted in a bearing system;
   a hub extending into the space of maximum cleanness for receiving therein at least one magnetic hard memory disc;
   means between said motor and said hub for driving said hub;
   means forming a magnetic flux shield and located between the parts producing the magnetic flux and the space of maximum cleanness for receiving the hard memory disc; and
   means detachably connecting the rotor and at least parts of the stator to the rotor shaft independently of any connection between said shaft and said hub.

2. A driving mechanism for magnetic hard discs, comprising:
   means in said mechanism isolating a space for maximum cleanness;

a multi-phase brushless direct current driving motor having self contained drive electronics including output stage transistors and a control circuit and mounted within said mechanism and having a rotor and a stator with a stack of laminations, said motor when energized having parts producing magnetic flux, said rotor being a permanent magnet outer rotor having a circular rotor casing and at least one permanent magnet housed in the rotor casing, the rotor casing being connected to a rotor shaft concentric thereto in the motor;

a hub extending into the space of maximum cleanness for receiving therein at least one magnetic hard memory disc;

means between said motor and said hub for driving said hub;

means forming a magnetic flux shield and located between the parts producing the magnetic flux and the space of maximum cleanness; and a circuit carrier provided for the drive electronics and control circuit whose output stage transistors are thermally connected to cooling plates electrically separate from one another, the cooling plates being fitted to a stator winding core and in turn supporting the circuit carrier.

3. A driving mechanism according to claim 2, wherein the cooling plates are fitted to the stator winding core by means of snap connections.

4. A driving mechanism according to claim 3, wherein legs are stamped and bent from the cooling plates for supporting the circuit carrier, said legs also being inserted and soldered in recesses of the circuit carrier.

5. A driving mechanism according to claim 3, wherein the snap connections are detachably constructed.

6. A driving mechanism according to claim 3 or 5, wherein the circuit carrier carries one or more position rotation detectors and the snap connections are randomly engaged in one of at least two differently reciprocal angular alignment positions between the stator winding core and the circuit carrier supported on the cooling plates.

7. A driving mechanism according to claim 6, wherein the position rotation detector or detectors are inserted through guidance openings in the cooling plate.

8. A driving mechanism according to claim 7, wherein the rotation position detector or detectors are fixed with respect to the guidance openings and are preferably press fitted in the said guidance openings.

9. A driving mechanism according to claim 2, wherein supports projecting from one end face of the winding core are provided for connecting the stator winding core to the cooling plates and said supports engage in recesses provided in the cooling plates.

10. A driving mechanism according to claim 9, wherein the supports are shaped onto a stator end plate.

11. A driving mechanism for magnetic hard discs, comprising:

means in said mechanism isolating a space for maximum cleanness;

a brushless direct current driving motor operated from externally located drive electronics and mounted within said mechanism and having a rotor and a stator with a stack of laminations, said motor when energized having parts producing magnetic flux, said rotor being a permanent magnet outer rotor having a circular rotor casing and at least one permanent magnet housed in the rotor casing, the rotor casing being connected to a rotor shaft concentric thereto in the motor;

a hub extending into the space of maximum cleanness for receiving therein at least one magnetic hard memory disc;

means between said motor and said hub for driving said hub;

means forming a magnetic flux shield and located between the parts producing the magnetic flux and the space of maximum cleanness; and a carrier plate for at least one rotation position detector being provided on the stator winding core by means of supports in alternatively one of at least two different reciprocal angular alignment positions between the winding core and the carrier plate.

12. A driving mechanism according to claim 11, wherein the carrier plate is mounted to the stator winding core by means of snap connections.

13. A driving mechanism according to claim 12, wherein the snap connections are detachably constructed.

14. A driving mechanism for magnetic hard discs, comprising:

means in said mechanism isolating a space for maximum cleanness;

a brushless direct current driving motor mounted within said mechanism and having a rotor and a stator with a stack of laminations, said motor when energized having parts producing magnetic flux, said rotor being a permanent magnet outer rotor having a circular rotor casing and at least one permanent magnet housed in the rotor casing, the rotor casing being connected to a rotor shaft concentric thereto in the motor, the rotor shaft being mounted in a bearing tube concentric therewith, said bearing tube being connected to a motor assembly flange;

a hub extending into the space of maximum cleanness for receiving therein at least one magnetic hard memory disc;

means between said motor and said hub for driving said hub;

means forming a magnetic flux shield and located between the parts producing the magnetic flux and the space of maximum cleanness, said shield being a substantially flat plate and fitted to the assembly flange; and a soft damping material located between the stator laminations and that part of the bearing tube carrying the stator laminations.

* * * * *

UNITED STATES PATENT AND TRADEMARK OFFICE
CERTIFICATE OF CORRECTION

PATENT NO. : 4,604,665

DATED : August 5, 1986

INVENTOR(S) : Muller et al.

It is certified that error appears in the above-identified patent and that said Letters Patent is hereby corrected as shown below:

Face of Patent, Primary Examiner, change "Wolf" to --Wolff--.

Col. 6, Line 21, change "pressed" to --presses--.

Col. 8, Line 28, change "pre-assembled" to --pre-assembable--.

Col. 9, Line 55, after "example" delete --possible--.

Col. 10, Line 4, delete "35" (second occurrence).

Signed and Sealed this

Seventh Day of April, 1987

*Attest:*

DONALD J. QUIGG

*Attesting Officer*  *Commissioner of Patents and Trademarks*